United States Patent [19]
Gehani et al.

[11] Patent Number: 6,098,078
[45] Date of Patent: Aug. 1, 2000

[54] MAINTAINING CONSISTENCY OF DATABASE REPLICAS

[75] Inventors: Narain H. Gehani, Summit; Alex Kononov, Bridgewater; Michael Rabinovich, Gillette, all of N.J.

[73] Assignee: Lucent Technologies Inc., Murray Hill, N.J.

[21] Appl. No.: 08/771,908

[22] Filed: Dec. 23, 1996

Related U.S. Application Data

[63] Continuation-in-part of application No. 08/580,954, Dec. 29, 1995, Pat. No. 5,765,171.
[60] Provisional application No. 60/013,953, Mar. 22, 1996.
[51] Int. Cl.[7] .................................................. G06F 17/00
[52] U.S. Cl. ........................ 707/203; 707/200; 707/201; 707/202
[58] Field of Search ................ 707/1–206; 395/182–200

[56] References Cited

U.S. PATENT DOCUMENTS

| | | | |
|---|---|---|---|
| 5,434,994 | 7/1995 | Shaheen et al. | 395/500 |
| 5,574,906 | 11/1996 | Morris | 395/601 |
| 5,577,240 | 11/1996 | Demers et al. | 395/608 |
| 5,581,753 | 12/1996 | Terry et al. | 395/617 |
| 5,581,754 | 12/1996 | Terry et al. | 395/608 |
| 5,600,834 | 2/1997 | Howard | 395/617 |
| 5,603,026 | 2/1997 | Demers et al. | 395/608 |
| 5,671,407 | 9/1997 | Demers et al. | 395/608 |

OTHER PUBLICATIONS

Jeffrey Ullman, Principles of Database and Knowledge–Base Systems, Computer Science Press, pp. 573–575, 1988.

*Primary Examiner*—Thomas G. Black
*Assistant Examiner*—David Y. Jung

[57] ABSTRACT

A method and apparatus for maintaining consistency in databases among data processors of a computer network involves an improved epidemic protocol involving the generation of database version vectors for database replicas. Overhead of the protocol grows linearly with the number of data items being copied during an update propagation, not with the number of data items as in typical epidemic protocols. Since this number is less than the total number of data items in the database, the present protocol promises significant reduction in overhead. A log record is generated including at least the name of the updated data item. The log record has an associated time stamp for the updated data item name in one embodiment or an associated version vector value in another. In the event of out-of-bound copying, an auxiliary log record is maintained.

32 Claims, 4 Drawing Sheets

MAINTAINING CONSISTENCY OF DATABASE REPLICAS

This application is a continuation-in-part of U.S. patent application Ser. No. 08/580,954, now U.S. Pat. No. 5,765,171 of the same inventors, filed Dec. 29, 1995 and based in part on provisional application Ser. No. 60/013,953 filed Mar. 22, 1996 by the same inventors.

BACKGROUND OF THE INVENTION a. Technical Field

The present invention relates to he field of database management for distributed processing systems and, more particularly, to maintaining consistency of database replicas within a distributed processing system via an improved epidemic protocol.

b. Description of the Relevant Art

Distributed processing systems typically involve the preservation and maintenance of replica databases throughout a system. Data replication is often used in distributed systems to improve availability and performance. Examples of replicated systems abound and include both research prototypes and commercial systems. A problem arises when one or more files or items of these database replicas is updated, thereby rendering the rest of the database replicas obsolete. In other words, when one replica is changed, the rest of the replicas should change accordingly; otherwise, replicas will diverge. Many distributed databases use an epidemic approach to manage replicated data. In the epidemic approach, user operations are executed on a single replica. Asynchronously, a separate activity performs the periodic pair-wise comparison of data item copies to detect and bring up to date obsolete database copies. This activity is known as anti-entropy and typically involves the comparison of time stamps of items/files and the propagation of updates to older replicas when the time stamps do not agree. The overhead due to comparison of data copies grows linearly with the number of data items in the database, which limits the scalability of the system.

On the other hand, epidemic protocols exhibit several desirable properties. User requests are serviced by a single (and often a nearby) server. Update propagation (the propagation of updates in the distributed system) can be done at a convenient time, for example, during the next dial-up session. Also, multiple updates can often be bundled together and propagated in a single transfer.

The anti-entropy overhead problem, it might appear, may be simply solved by having each server accumulate its updates and periodically push them to all other replicas, without any replica comparison. The need for time stamp comparison is then eliminated. However, the following dilemma arises. If recipients of the updates do not forward them further to other nodes, then full responsibility for update propagation lies with the originating server. A failure of this server during update propagation may leave some servers in an obsolete state for a long time, until the originating server is repaired and can complete the propagation. On the other hand, forwarding updates by servers to each other would create redundant traffic on the network.

Update propagation can be done by either copying the entire data item or by obtaining and applying log records for missing updates. Among known commercial systems, "Notes" (tm) software available from Lotus (now IBM) uses whole data item copying. Oracle's Symmetric Replication system copies update records.

The Lotus Notes protocol associates a sequence number with every data item copy, which records the number of updates seen by this copy. As an epidemic protocol, Lotus assumes that whole databases are replicated, so that anti-entropy is normally invoked once for all data items in the database. Each server records the time when it propagated updates to every other server (called the last propagation time below).

Consider two nodes, i and j, that replicate a database. Let i invoke an instance of anti-entropy to compare its replica of the database with that of server j, and catch up if necessary. Anti-entropy executes the following algorithm:

1. When node j receives a request for update propagation from i, it first verifies if any data items in its replica of the database have changed since the last update propagation from j to i. If no data item has changed, no further action is needed. Otherwise, j builds a list of data items that have been modified since the last propagation. The entries in the list include data item names and their sequence numbers. j then sends this list to i.

2. i compares every element from the received list with the sequence number of its copy of the same data item. i then copies from j all data items whose sequence number on j is greater.

This algorithm may detect in constant time that update propagation is not required, but only if no data item in the source database has been modified since the last propagation with the recipient. However, in many cases, the source and recipient database replicas will be identical even though the source database has been modified since the last update propagation to the recipient. For instance, after the last propagation between themselves, both nodes may have performed update propagation from other nodes and copied some data modified there. Or, the recipient database may have obtained updates from the source indirectly via intermediate nodes.

In these cases, Lotus incurs high overhead for attempting update propagation between identical database replicas. At the minimum, this overhead includes comparing the modification time of every data item in the source database against the time of the last update propagation. Thus, it grows linearly in the number of data items in the database.

In addition, the first step of the algorithm will result in a list of data items that have been modified or obtained by j since the last propagation. This list will be sent to i, who then will have to perform some work for every entry in this list in step 2. All this work is overhead.

According to Kawell, Jr. et al, "Replicated Document Management in a Group Management System," Second Conference on Computer-Supported Cooperative Work, September, 1988, it appears that the Lotus update propagation protocol correctly determines which of two copies of a data item is newer only provided the copies do not conflict. When a conflict exists, one copy is often declared "newer" incorrectly. For example, if i made two updates to x while j made one conflicting update without obtaining i's copy first, $x_i$ will be declared newer, since its sequence number is greater. It will overide $x_j$ in the next execution of update propagation. Thus, this activity does not satisfy "correctness criteria" as will be further described herein.

Unlike Lotus Notes, Oracle's Symmetric Replication protocol is not an epidemic protocol in a strict sense. It does not perform comparison of replica control state to determine obsolete replicas. Instead, it simply updates records by applying log records for missing updates. Every server keeps track of the updates it performs in a log and periodically ships them to all other servers. No forwarding of updates is performed.

In the absence of failures, this protocol exhibits good performance. However, a failure of the node that originated updates may leave the system in a state where some nodes have received the updates while others have not. Since no forwarding is performed, this situation may last for a long time, until the server that originated the update is repaired. This situation is dangerous, not only because users can observe different versions of the data at the same time, but also because it increases the opportunity for user updates to be applied to obsolete replicas, thus creating update conflicts. Thus, Oracle is susceptible to failures during update propagation.

Consequently, neither the Lotus Notes protocol nor the Oracle protocol are perfectly successful in maintaining consistency in replicated databases, and there is room for improvement in the art.

SUMMARY OF THE INVENTION

In our previous patent application, U.S. patent application Ser. No. 08/580,954, filed Dec. 29, 1995 (the '954 application), bearing the same title and incorporated herein by reference as to its entire contents, we introduced the concept of a database version vector to determine quickly whether a replicated database requires an update propagation without having to compare copies of all the data items in the database. However, once the need for update propagation was determined, the update propagation was performed in a conventional manner by comparing copies of every data item. Now, we expand upon the principles of that patent application to propose a method for update propagation that avoids examining every data item. In accordance with further embodiments, we now exploit the assumption that update propagation is usually done for all data items at once in the database replicas (as an atomic process). To accomplish this we propose log vectors and further consider out-of-bound copying that relaxes the atomicity assumption, principles of which will be further described herein.

In accordance with the present invention, we propose an epidemic protocol that, like the protocol described in the '954 application, detects whether update propagation between two replicas of the whole database is needed in constant time, independently of the number of data items in the database. Moreover, when update propagation is required, it is done in time that is linear in the number of data items to be copied, without comparing replicas of every data item. Typically, the number of data items that are frequently updated (and hence need to be copied during update propagation) is much less than the total number of data items in the database. Thus, our protocol promises significant reduction of overhead.

The protocol of the present invention is based on version vectors, first proposed by Popek et al., "LOCUS: A Network Transparent, High Reliability Distributed System" in *Proceedings 8th Symposium on Operating Systems Principles*, 1981, pp. 169–177. Version vectors detect inconsistencies between replicas of a data item and are widely used for various other purposes in distributed systems. In existing replicated systems based on version vectors, a server i associates a version vector with every data item replica $x_j$ stored on this server. This vector (described in greater detail subsequently herein) records in its j-th component the number of updates originally performed by server j and reflected in $x_i$. By comparing the version vectors of two copies of a data item, the system can tell which of the two is more recent. Therefore, the older replica can catch up, e.g., by copying the newer replica. As other existing epidemic protocols, version vector-based protocols impose significant overhead on the system due to pair-wise comparison of version information (version vectors in this case) of data item replicas.

The initial idea behind the protocol of the present invention is simple: similar to the invention of the '954 application, we associate version vectors with the entire database replicas, instead of (or, in fact, in addition to) replicas of individual data items. Then, we perform anti-entropy between replicas of entire databases. Anti-entropy would compare the version vectors of two database replicas to detect in constant time whether update propagation between replicas of any data item in the database is required, and if so, infer which data items must be copied by looking at these version vectors and database logs.

However, there are two main challenges in implementing this idea. First, our goal to limit update propagation time dictates that only a constant number of log records per data item being copied can be examined or sent over the network. However, the number of log records is normally equal to the number of updates and can be very large. This problem required development of an interesting mechanism for log management to be described further herein as maintenance of log vectors for updates. In one embodiment of the present invention, a log record has the form (x,m) where x is the name of the updated data item and m is the number of updates that the node that performed the update had at the time of the update. In another embodiment described toward the end of the present application, the log record is of the form (x,t) where t is a timestamp applied by that node to the update.

The second problem is that we rely now on the assumption of atomicity of update propagation between entire database replicas. Specifically, our idea implies that update propagation is always scheduled for all data items in the database at once. In contrast, existing version vector-based protocols including that described in our '954 application allow update propagation to be scheduled differently for each individual data item. While it is not feasible to provide different schedules for each data item in the database, the ability to reduce the update propagation time for some key data items is important. Thus, we must allow nodes to obtain a newer version of a particular data item at any time, in addition to normally scheduled update propagation. We call these data items, obtained by direct copying outside the normal update propagation procedure, out-of-bound data items. Out-of-bound data violates certain ordering properties of updates on a node, which are essential for the correctness of our protocol.

In our previous '954 application, we introduced the concept of out-of-bound copying but treated out-of-bound copying in the same manner as a normal update propagation because we did not rely on the atomicity of update propagation. Thus, out-of-bound copying as applied in the invention of our '954 application did not introduce additional overhead to the update propagation.

In the present invention, we treat out-of-bound data completely differently from the rest of the data. When a node copies a data item out of bound, it does not modify its database version vector or database logs. Instead, it creates parallel data structures: an auxiliary data item and an auxiliary log. The node then uses the auxiliary copy for servicing user operations and requests for out-of-bound copying of this data item from other nodes. At the same time, the node uses the "regular" copy of the data item for scheduled update propagation activity. In addition, a special intra-node update propagation procedure ensures that updates from the auxiliary log are eventually applied to the regular copy without violating the update orderings required by the protocol. When the regular copy catches up with the auxiliary copy, the latter is discarded. This separation of out-of-bound and regular data may be achieved at an expense of some additional cost, both in storage for keeping auxiliary data and in processing time for intra-node update propagation. Thus, an assumption behind our protocol is that the number of out-of-bound data items is small relative to the total number of data items. However, such an assumption is reasonable in reference to many applications of the present invention.

In summary and in contrast to the '954 application, the present invention proposes a process for efficiently performing update propagation between database replicas as opposed to that of the '954 application which simply detected the need for update propagation and applied conventional update propagation processes. On the other hand, we do so at the expense of relying on the atomicity of update propagation which implies that partially completed update propagation is wasted and out-of-bound data requires separate treatment.

Moreover, it is a principle of the present invention to explicitly specify correctness criteria for update propagation, separately from correctness criteria for database transactions. This allows formal reasoning about correct propagation independently from the data consistency guarantees provided by the system.

Further features of the present invention will be clarified by reading the following detailed description of the invention as may be understood from the drawings briefly described as follows.

BRIEF DESCRIPTION OF THE DRAWINGS

FIG. 1 is a simplified illustration of a conventional replicated distributed system in which the present invention may be applied.

FIG. 2 is a block diagram of an exemplary network site within the distributed system of FIG. 1.

FIG. 3 illustrates examples of updating version vectors.

FIG. 4 is an illustrative embodiment of a database version vector (DBVV).

FIG. 5 is a simplified flowchart depicting the steps for performing an update propagation.

FIG. 6 illustrates an example of updating database version vectors when version vectors are employed to represent version information of data items.

DETAILED DESCRIPTION OF THE DRAWINGS

Figure 1:
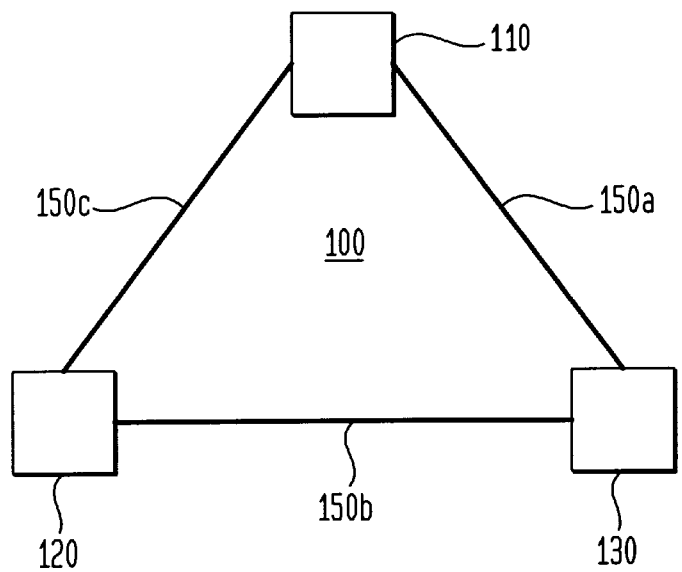
FIGS. 1–6 appear in our previous U.S. patent application Ser. No. 08/580,954, filed Dec. 29, 1995.

The present invention as well as that of our '954 application relates to a replicated distributed system. In particular, the invention is directed to a protocol which efficiently determines if update propagation between two replicas of the same database is required. Referring to FIG. 1, there is shown a simplified illustration of a conventional replicated distributed system 100. Distributed system 100 comprises a plurality of sites, for example, sites 110, 120 and 130. The sites of distributed system 100 are linked together by communications links, for example, links 150a–150c. The physical implementation of the communications links may vary from application to application. For example, the communications links may be in the form of a local area network (LAN), a metropolitan area network (MAN) or a wide area network (WAN). The sites may be "loosely connected", i.e., connected through dial-up connections or wireless connections such as earth-based cellular links, satellite links, internet links or other links.

Figure 2:
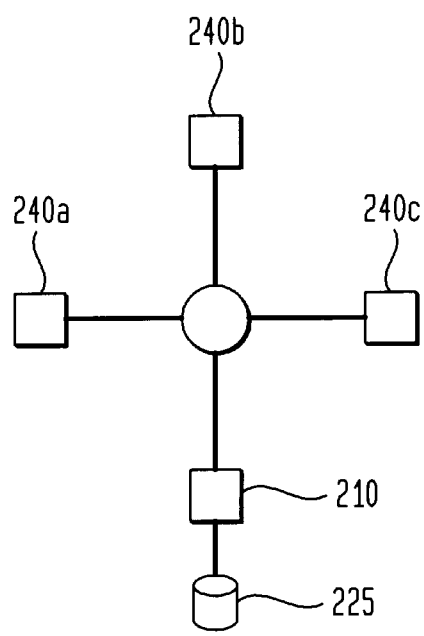

FIG. 2 is an exemplary site 200 of the distributed system 100 of FIG. 1, for example, site 110. As shown, the site 200 includes a plurality of clients 240a–240c networked to a server 210 by a LAN, MAN or WAN or otherwise linked. The clients, for example, may be equipped with personal computers, work stations or terminals. A detailed description of each of these is not provided here but software embodying the present invention may reside at a personal computer, be shared off the network or provided at a main or other shared computer. Software practicing the improved epidemic protocol of the present invention involving the generation of database version vectors may be loaded from media into program memory storage of any one of the elements of the depicted and described sites and so shared or implemented in a stand-alone mode.

A database replica may be shared by clients or stored locally by a client on individual personal computers. Other clients (not shown) may be connected via remote links. While the clients are shown to be associated with a particular site, they may connect to other servers at other sites within the system using remote links, such as dial-up connections with modems, wireless connection or connections via the internet. Furthermore, it is understood that clients may have similar or different configurations from each other, and other clients may be included as desired. In addition, one or more clients may be located on the server. Server 210 is, in some embodiments, a mainframe computer system, a work station, or a personal computer that includes preferably non-volatile storage device 225, such as magnetic disk, optical disk or other device for data storage. The data stored on storage device 225 includes data items, files and the like which are organized into one or more groups called databases.

Consequently, FIG. 1 shows a collection of networked servers that keep and maintain databases, which are collections of data items. A database can be replicated (as a whole) on multiple servers. We will refer to an instance of a database (data item) kept on an individual server as a replica or copy of the database (data item). For simplicity, we will assume for the purposes of the following discussion that there is a single database in the system. When the system maintains multiple databases, a separate instance of the protocol of the present invention runs for each database.

Different replicas of a data item are kept consistent using an epidemic protocol: user operations are serviced by a single server; asynchronously, updates are propagated throughout the network by an anti-entropy process. In addition to periodically scheduled update propagation, a server may obtain a newer replica of a particular data item at any time (out-of-bound), for example, on demand from a user.

Update propagation can be done by either copying the entire data item, or by obtaining and applying log records for missing updates. For instance, among commercial systems, Lotus Notes uses whole data item copying, while Oracle Symmetric Replication copies update records. Many of the ideas described herein are applicable for both these methods. We chose whole data copying as the presentation context in this specification.

The protocol is targeted towards applications where the number of data items copied during update propagation is small compared to the total number of data items. In other words, the fraction of data items updated on a database replica between consecutive update propagations is in general small. Another assumption for the workload is that relatively few data items are copied out-of-bound (to be discussed subsequently herein).

We do not make any assumptions about the level of replica consistency guaranteed by the system. The system may enforce strict consistency, e.g., by using tokens to prevent conflicting updates to multiple replicas. (In this approach, there is a unique token associated with every data item, and a replica is required to acquire a token before performing any updates.) Or, the system may use an optimistic approach and allow any replica to perform updates with no restrictions. In the latter approach, when conflicting updates are discovered, they are resolved in an application-specific manner (which often involves manual intervention). Also, we leave it to the user of our invention to rationally determine any tradeoff between optimistic and pessimistic replica management. The concepts presented here are equally applicable to both approaches.

Neither do we assume anything about the transactional model supported by the system. The system may use two-phase locking on an individual server while relying on optimism for replica consistency. The system can also choose to provide guaranteed serializability of transactions by executing on top of a pessimistic replica control protocol. Finally, the system may not support any notion of multi-data-item transactions at all (like Lotus Notes). Also, to simplify the discussion, we assume that the set of servers across which a database is replicated is fixed.

Correctness Criteria

We assume certain correctness criteria for application of the epidemic protocol of the present invention. We assume that actions performed by individual nodes are atomic. In particular, any two updates or an update and a read on the same data item replica are executed in some serial order. Thus, all updates reflected in a replica form a serial history $h=\{op_1, op_n\}$, according to the order in which these updates executed.

To reason about correctness of update propagation, we need a few definitions as follows:

Inconsistent data item replicas:

Let $x_A$ and $x_B$ be two replicas of a data item x. $_A x$ and $_B x$ are called "inconsistent" or "in conflict" if there are updates $op_i$ and $op_j$ such that $x_A$ reflects update $op_i$ but not $op_j$, while $x_B$ reflects $op_j$ but not $op_i$.

Older and newer data item replicas:

$x_A$ is called "older or "less recent" than $x_B$ (and $x_B$ is called "newer" or "more recent" than $x_A$ if the update history of $x_A$ is a proper prefix of the update history $x_B$. A replica of a data item is called "obsolete" if there is a newer replica of the same data item in the system.

According to the principles of the present invention, then, we assume the following correctness criteria for update propagation.

1. Inconsistent replicas of a data item must be eventually detected.
2. Update propagation cannot introduce new inconsistency. In other words, data item replica $x_i$ should acquire updates from $x_j$ only if $x_j$ is a newer replica.
3. Any obsolete data item replica will eventually acquire updates from a newer replica.

In particular, if update activity stops, all data item replicas will eventually catch up with the newest replica.

Version Vectors

Version vectors detect inconsistencies among replicas and, as described above, have been widely used for other various purposes in distributed systems.

Consider a set of servers, $\{1, \ldots n\}$, that keep copies of a data item x. Denote $x_i$ to be the copy of x kept by server i. Every server i maintains a version vector $v_i(x)$ associated with its copy of x. This version vector has an entry (an integer number) $v_{ij}(x)$ for each server j that keeps a copy of the data item.

The rules for maintaining version vectors are as follows. Upon initialization, every component of the version vector of every replica of the data item is 0.

When a server i performs an updates of data item $x_i$, it increments its "own" entry (i.e., $v_{ii}(x)$) in its version vector for $x_i$.

When server i obtains missing updates for x from a server j (either by copying the whole data item or by obtaining log records for missing updates), i modifies $v_i(x)$ by taking the component-wise maximum of $v_i(x)$ and $v_j(x)$: $V_{ik}^{new}(x) = \max(V_{ik}^{old}, V_{jk})(1 \leq k \leq n)$. The following definition will be used in a theorem and associated corollaries provided below:

Definition. Version vector $v_i(x)$ is said to be "dominated" by version vector $v_j(x)$ if (a) version vector $v_i(x)$ is component-wise smaller or equal to $v_j(x)$, and (b) at least one component of $v_i(x)$ is strictly less than the corresponding component of $v_j(x)$.

The following is known about version vectors:

Theorem. Let a node i obtain missing updates for data item x from node j only if $v_i(x)$ is dominated by $v_j(x)$. Then, at any time, $v_{ij}(x)=u$ if and only if i's replica of x reflects the first u updates that were made to this data item on server j.

In particular, then, the following corollaries to this theorem hold:

1. If two copies of the same data item have component-wise identical version vectors, then these copies are identical.
2. For two replicas of the data item, $x_i$ and $x_j$ and some server k, let $v_{ik}<v_{jk}$ and $v_{jk}-v_{ik}=u$. Then, $x_i$ has seen u fewer updates performed on server k and reflected on $x_j$. Moreover, these missing updates are the last updates from server k that were applied to $x_j$.
3. A copy $x_i$ is older than a copy $x_j$ if version vector $v_i(x)$ is dominated by $v_j(x)$.
4. Copies $x_i$ and $x_j$ are inconsistent if there exist k and i such that $v_{ik}(x)<v_{jk}(x)$ and $v_{i1}(x)>v_{j1}(x)$. We will call two version vectors with this property "inconsistent" version vectors.

Indeed, this means that $x_i$ has seen some updates (made on server 1) that has not received; at the same time, $x_i$ has not seen some updates made on server k and reflected in $x_j$.

Given these facts, update propagation can be done by periodically comparing version vectors of pairs of data item replicas and either doing nothing (if both replicas have identical version vectors), or bringing the older replica up-to-date, or flagging a conflict.

Data Structures

Now the data structures and some utility functions used by the protocol will be further described followed by a description of the epidemic protocol of the present invention in the next section.

Consider a system with n nodes replicating a database. As before, every node i maintains an item version vector (IVV) for every data item $x_i$ in i's replica of the database. Database data structures according to the present invention are now described in contrast to item version vectors.

Our protocol associates version vectors with entire replicas of databases. These version vectors are referred to as "database version vectors" or (DBVV), as opposed to data item version vectors, or (IVV), described above. A DBVV is similar in many ways to an IVV, except its components record the total number of updates performed on corresponding servers to all data items in the database replica.

More formally, node i keeps a database version vector $V_i$ with n components, where n is the number of nodes maintaining a replica of the database, with the following maintenance rules.

1. Initially, all components of $V_i$ are 0.
2. When node i performs an update to any data item in the database, it increments its component in the database version vector: $V_{ii}^{new} = V_{ii}^{old} + 1$
3. When a data item x is copied by i from another node j, i's DBVV is modified to reflect the extra updates seen by the newly obtained copy of the data item: $V_{il}^{new} = V_{il}^{old} + (v_{jl}(x)), 1 \leq l \leq n$, where $v_{km}(x)$ is the mth component of the IVV associated with data item x on node k.

To get an intuition behind the last rule, consider an arbitrary node 1. $X_i$ has seen $v_{i1}(x)$ updates originally performed by 1, and $x_j$ has seen $v_{i1}(x)$ such updates. Our protocol will copy x from j to i only if $x_j$ is more recent. Thus, $v_{i1}(x) \leq v_{j1}(x)$, and the additional number of updates seen by $x_j$ that were originated on 1 is $(v_{j1}(x) - v_{i1}(x))$. Once i copies the value of $x_j$, the total number of updates originated on 1 and seen by all data items in i's database increases by this amount. Therefore, component $V_{i1}$ of ith DBVV must increase accordingly.

In this embodiment, it is assumed that update propagation is done for all items of the replicated data base at once, that is, as a so-called atomic operation. In the following section we will discuss a log for recording for each data item. The log indicates for every server the last update for that data item that the server to which the log belongs knows about. When the database version vector indicates that an update is necessary, the log is used to determine what data items must be updated.

In our previous patent application, U.S. application Ser. No. 08/580,954, filed Dec. 29, 1995 and incorporated herein as to its entire contents, database version vectors are used to determine whether a given replicated database needs an update propagation before doing the individual comparisons required to perform the update. The necessary property of a database version vector is that: if two database replicas a and b are different, then, there exist two (possibly other than a and b) database replicas whose database version vectors are different.

Our '954 application allowed for non-atomic update propagation, that is, when update propagation is not done for all data items of a replicated database at once. As described in that application, non-identical database version vectors may have identical database version vectors, thus preventing more recent versions of data items from being propagated to the recipient server. For example, one server makes an update to two data items. Subsequently, another server copies one of the data items and yet another server copies the other data item from the first server. At this point the database version vectors of each of the two servers which copied a data item from the first will have identical database version vectors, but their replicas are clearly not identical. Consequently, the anti-entropy process between the two servers will not propagate any updates. Nonetheless, according to the necessary property of database version vectors, the first server has a different database version vector and will show a different status from the two that copied from it. Thus, if anti-entropy is scheduled in such a way that each server communicates to every other server (directly or indirectly) all updates will propagate throughout the system.

Figure 3:
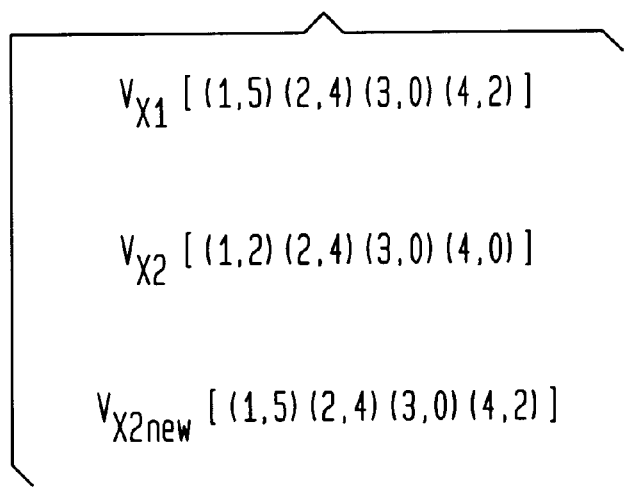
Figure 4:
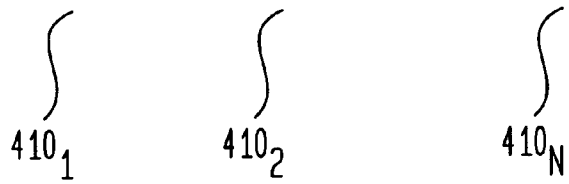
Figure 4:
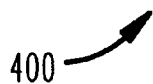

For the most part, FIGS. 1–6 are reproduced here from the '954 application for consistency between the present application and the '954 application. FIGS. 1 and 2 have already been discussed. FIG. 3 from the '954 application describes how version vectors associated with copies of a data item x are updated. A unique database version vector (DBVV) is associated with each database replica in the system for keeping track of the total number of updates made to any data item in its respective database replica and on which server each update was originally performed. FIG. 4 from the '954 application describes an illustrative embodiment of the DBVV 400 containing N entries, each corresponding to one of the N number of servers that maintain a database replica. Each entry, for example, is in the form (SID, COUNT) where SID is a server ID that identifies a server in the system, and COUNT is an integer called the count update. The update count indicates the number of updates originating from the server contained in SID.

Figure 5:
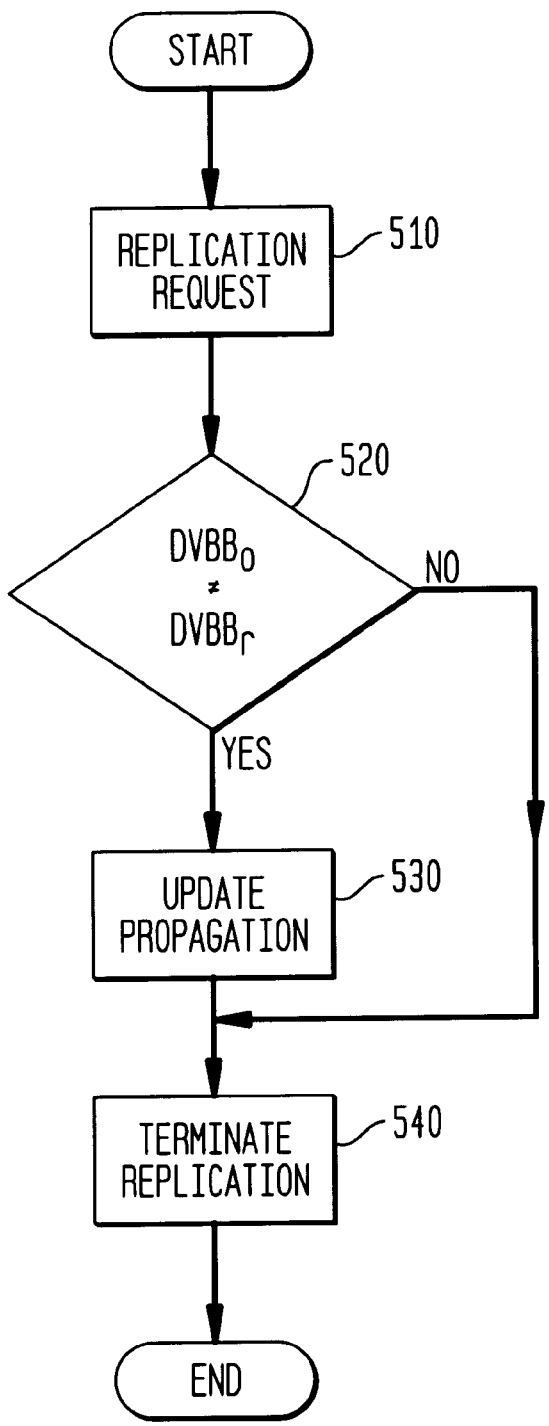

FIG. 5 from the '954 application is a flow diagram depicting the steps of the replication (anti-entropy) process between a source server and a recipient server.

Figure 6:
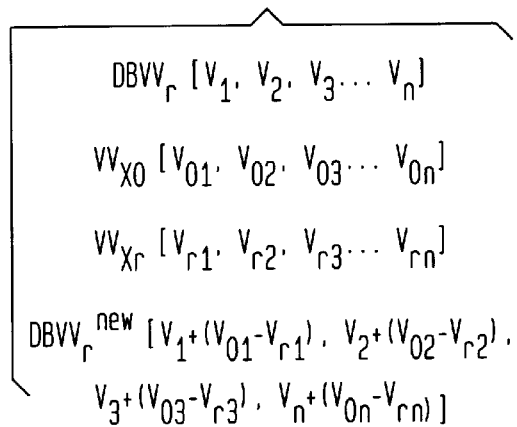

FIG. 6 from the '954 application illustrates how the database version vector (DBVV) of a recipient server is modified when version vectors (VV's) are used to represent version information of data items. The recipient database version vector includes n components corresponding to the n number of servers with a replica of the same database.

Now returning to our description of the present invention, the log vectors will be described in some detail.

The Log Vector

The log on server i conceptually has a record $l(x,j)$ for every data item x and every server j. This record corresponds to the latest update to x originally performed by server j and reflected in server i's copy of x. It contains the number of updates performed by server j at the time of the updates.

An anti-entropy protocol run between recipient i and source j compares DBVV of the recipient and source database replicas. If both are identical, or the recipient's DBVV dominates, no update propagation is performed. So, this case takes only constant time to be detected. Otherwise, for every server k such that its corresponding DBVV component on the source is greater than on the recipient, the source includes into the set of data items to be sent to the recipient all data items x whose log records for server k, $l(x,k)$, contain a greater count than k's component of the recipient's DBVV, $V_{ik}$. When the recipient receives the data items, it installs the new version of the data, and updates its DBVV and log to reflect newly acquired updates.

For this approach to work, we must provide an efficient way to maintain and access the logs.

The functionality required of the log involves the following:

(1) Whenever a server i performs an update to data item x, it must reflect this update in the log;
(2) Given DBVV $V_j$, server j must extract from its log all records $l(x,k)$ whose update count is greater than $V_{jk}$;
(3) When a recipient in anti-entropy protocol, server i, receives log records and newer versions of data items, it must modify its log to reflect newly received updates.

In one embodiment of a log, this functionally can be implemented as follows:

Node i maintains a log vector of updates, $L_i$. Each component, $L_{ij}$, records updates performed by node j (to any data item in the database) that are reflected on node i. The order of the records in $L_{ij}$ is the same as the order in which j performed the updates.

Records are added to the log when node i performs updates to non out-of-bound data items. New records can also be added to the log when they are obtained from the source node during update propagation.

A log record has a form (x,m), where x is the name of the updated data item, and m is the update count which is given by the value of $V_{jj}$ that node j had at the time of the update (including this update). (From our previous discussion above, it may be recalled that $V_{jj}$ counts updates performed by j.) So, m gives the sequence number of the update on node j. Note that log records only register the fact that a data item was updated, and not information to re-do the update. Thus, these records are very short.

The key point is that, from all updates performed by j to a given data item that i knows about, only the record about the latest update to this data item is retained in $L_{ij}$. Hence, when a new record (x, m) is added to $L_{ij}$, the existing record referring to the same data item is discarded.

Figure 7A:
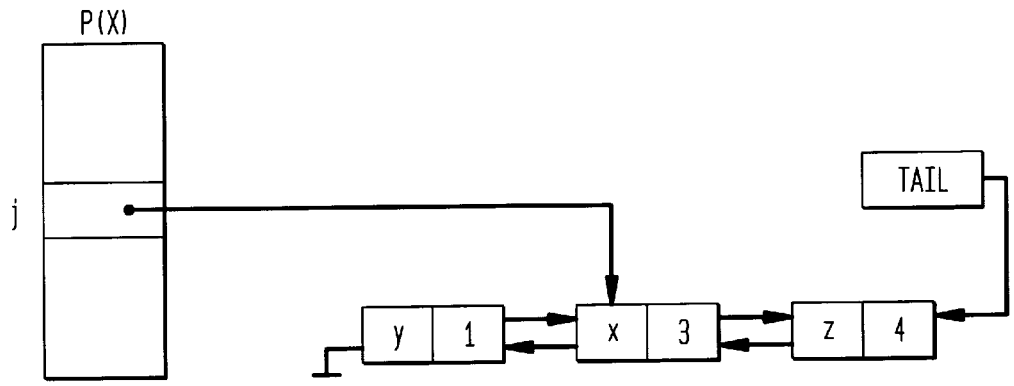
FIG. 7a shows the structure of a log component before and FIG. 7b after adding a record to a log via a doubly linked list showing how a pointer is updated to point to the newly added record.
Figure 7B:
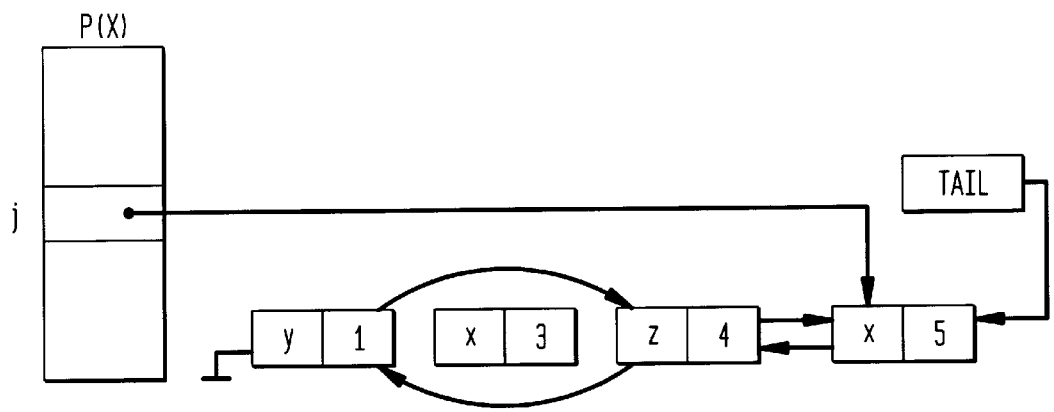

To do this efficiently, all records in $L_{ij}$ are organized in a doubly linked list (see FIG. 7). Referring first to FIG. 7a, an array of pointers P(x) is associated with every data item $x_i$. Its component $P_j$ contains the pointer to the existing record in $L_{ij}$ referring to x. Referring to FIG. 7b, when a new record (x,m) is added, the following AddLogRecord procedure is executed:

AddLogRecord(node number j, record e=(x,m)):
    The new record e is linked to the end of log $L_{ij}$;
    The old log record referring to the same data item is located in constant time using pointer $P_j(x)$ and un-linked from the log;
    Pointer $P_j(x)$ is updated to point to the newly added record.

Note that every log $L_{ij}$ may contain at most one record per data item in the database. Thus, the total number of records in the log vector is bounded by nN, where n is the number of servers and N is the number of data items.

Now Auxiliary items and IVV's will be discussed, continuing our discussion with out-of-bound items.

Auxiliary Data Items and IVVs

When a data item x is copied out-of-bound (i.e., outside the normal update propagation), a separate auxiliary copy of this data item, x' is created. An auxiliary copy has its own version vector, which is called auxiliary IVV.

Node i performs all updates to x on its auxiliary copy, while update propagation continues using regular copies. When regular copies "catch up" with auxiliary copies, the latter are discarded.

The Auxiliary Log

The auxiliary log, $AUX_i$, is used to store updates that i applies to out-of-bound data items. Records in the auxiliary log are of the form (m, x, $v_i(x)$, op), where x is the name of the data item involved, $v_i(x)$ is the IVV that the auxiliary copy of x had at the time the update was applied (excluding this update) and op is the operation executed (e.g., the byte range of the update and the new value of data in the range). Thus, unlike records in the log vector, auxiliary log records contain information sufficient to re-do the update, and hence they can be much bigger. However, these records are never sent between nodes.

The auxiliary log must be able to support efficiently (in constant time) a function Earliest(x) that returns the earliest record in $AL_i$ referring to data item x. Also, we must be able to remove in constant time a record from the middle of the log. These requirements can be easily satisfied with a list structure of the auxiliary log. The details are straightforward and are omitted.

We will often refer to auxiliary data items, their IVVs, and the auxiliary log as auxiliary data structures, as opposed to the rest of the node state, which will be called regular data structures.

The Protocol

The protocol consists of procedures executed when a node performs an update, when it propagates updates from another node j, and when it copies a later version of a data item from another node (out-of-bound copying).

Update Propagation

Update propagation is done between a recipient node i and a source node j using exclusively regular data structures, regardless of prior out-of-bound copying that might have taken place between the two nodes. For instance, if i had previously copied a newer version of data item x from j as an out-of-bound data and its regular copy of x is still old, x will be copied again during update propagation. In other words, out-of-bound copying does not reduce the amount of work done during update propagation.

When node i performs update propagation from node j, the following steps are executed:

(1) i sends $V_i$ to j. In response, j executes SendPropagation procedure in below. In this procedure, j compares the received version vector with $V_j$. If $V_i$ dominates or equals $V_j$, there is no need for update propagation, and the protocol terminates.

```
SendPropagation(i, V_i):
    if V_i dominates or equals V_j{
        send "you-are-current" message to I and exit;
    }
    for k = 1 to n {
        if (V_jk > V_ik) {
            D_k = Tail of L_jk containing records (x, m) such
                  that m > V_ik;
        else
            D_k = NULL;
        }
    }
    send D and a set S of data items referred to by records in D to i;
end
```

Otherwise, j builds a tail vector, D, whose kth component contains log records of updates performed by node k that node i missed, and list S of data items referred to by these records. Note that only regular (non-auxiliary) copies of data items are included into S. j then sends D and S to i. In addition, with every data item x in S, j includes its IVV $v_j(x)$.

(2) When i receives the response from j with D and S, it executes the AcceptPropagation procedure below. It goes through data items from S. For every such data item $x_j$, i compares $x_j$'s version vector, $v_j(x)$, with the version vector of its local copy of x, $v_i(x)$.

```
AcceptPropagation(D, S):
    for every x_j in S {
        if v_j(x) dominates v_i(x){
            adopt x_j from S as a new regular copy x_i;
            v_i(x) := v_j(x);
        else
            declare x_i and x_j inconsistent;
            remove records referring to x from D;
        }
    }
    for each tail D_k from D {
        for every record r from D_k (going from the head of D_k
        to tail) {
            AddLogRecord(k,r);
        }
    }
end
```

If $v_j(x)$ dominates $v_i(x)$, i adopts the received copy and modifies $V_i$ according to the DBVV maintenance rule 3.

Otherwise, i alerts the system administrator that copies $x_i$ and $x_j$ are inconsistent and removes all log records referring to x from all log tails in D (preserving the order of the remaining records). Note that we do not consider the case when $v_i(x)$ dominates $v_j(x)$ because this cannot happen as will be described subsequently herein.

Finally, i appends log tails from the tail vector to the corresponding logs of its log vector, using the AddLogRecord procedure from above.

Note that removing records that refer to conflicting data items from the tail vector may be an expensive operation. However, this is done only if conflicts are found (which is supposed to be an extraordinary event).

(3) i performs intra-node update propagation on below to see if any updates accumulated in the auxiliary log can be applied to regular data item.

auxiliary IVVs conflict, deferring conflict detection to the AcceptPropagation procedure.)

Out-of-bound Data Copying

A node i according to our protocol can obtain a newer version of an individual data item from any server j at any time. This can be done in addition to regular update propagation described above that causes all data at the recipient node to catch up with the data at the source. As already mentioned, data items obtained by direct copying, outside the normal update propagation procedure, are called out-of-bound data items.

Upon receiving an out-of-bound request for data item x, j sends the auxiliary copy $x'_j$ (if it exists), or the regular copy $x_j$ (otherwise), together with the corresponding IVV (auxiliary or regular). Auxiliary copies are preferred not for correctness but as an optimization: the auxiliary copy of a data item (if exists) is never older than the regular copy.

```
IntraNodePropagation:
    for every data item x copied during execution of AcceptPropagation {
        if auxiliary copy of x, x'_i, exists {
            let e = Earliest(x);
            let v_e(x) and OPC be version vector and update operation from e;
            while e ≠ NULL and v_i(x) = v_e(x) {
                apply op_e to x_i;
                v_ii(x) = v_ii + 1;
                V_ii = V_ii + 1;
                append log record (x, V_ii) to L_ii;
                remove e from AUX_i;
                e = Earliest(x)
                let v_e(x) and op_e be version vector and update operation from e;
            }
            if e = NULL {
                if v_i(x) dominates or is equal to v_i(x') {
                    remove auxiliary copy x'_i;
                }
            }
            else
                if v_i(x) conflicts with v_e(x) {
                    declare that there exist inconsistent replicas of x;
                }
            }
        }
    }
end
```

For every data item x copied in step 2, if auxiliary copy x' exists, i compares the IVV of the regular copy, $v_i(x)$, with the IVV stored in record Earliest(x), the earliest auxiliary log record referring to x.

If both are identical, the operation from this record is applied to the regular copy. All actions normally done when a node performs an update on the regular copy of a data item are executed: $v_{ii}(x)$ and $V_{ii}$ are incremented by 1, and a log record $(x,V_{ii})$ is appended to $L_{ii}$. Finally, the auxiliary record Earliest(x) is removed from auxiliary log.

If $v_i(x)$ and the IVV of the Earliest(x) record conflict, there exist inconsistent copies of x, and conflict is declared. In fact, the nodes where inconsistent replicas reside can be pinpointed: if the above version vectors conflict in components k and l, then nodes k and l have inconsistent replicas of x.

The whole process is repeated until either the next earliest auxiliary record has version vector that dominates or conflicts $v_i(x)$, or until the auxiliary log contains no more records referring to x. ($v_i(x)$ can never dominate a version vector of an auxiliary record.) In the latter case, the final comparison of the regular and auxiliary IVVs is done to see whether the regular copy of x has caught up with the auxiliary copy. If so, the auxiliary copy of x can be deleted. (We do not check here whether or not the regular and When i receives the response, it compares the received IVV, $v_j(x)$, with its local auxiliary IVV (if auxiliary copy $x'_i$ exists) or regular IVV (otherwise). If $v_j(x)$ dominates, then the received data is indeed newer. Then, i adopts the received data item and IVV as its new auxiliary copy and auxiliary IVV. If $v_j(x)$ is the same as or dominated by the local IVV (auxiliary or regular, as explained above), the received data item is actually older than the local copy; i then takes no action. If the two IVVs conflict, inconsistency between copies of x is declared.

Note that no log records are sent during out-of-bound copying, and the auxiliary log of the recipient is not changed when the old auxiliary copy of x is overwritten by the new data.

Updating

When a user update to data item x arrives at node i, i performs the operation using auxiliary data structures (if the auxiliary copy of x exists), or regular data structures (otherwise). In the first case, i applies the update to the auxiliary copy x', appends a new record $(x, v_i(x'),$ update) to the auxiliary log, and then modifies the auxiliary IVV: $v_{ii}(x')=v_{ii}(x')+1$.

In the second case, i applies update to the regular copy x; modifies IVV of the regular copy and DBVV: $v_{ii}(x)=v_{ii}(x)+1$, $V_{ii}=V_{ii}+1$; and then appends a log record $(x, V_{ii})$ to $L_{ii}$.

Performance

The procedure AddLogRecord is executed in the protocol only when the data item x mentioned in the record being added is accessed anyway. Thus, the location of P(x) is known to AddLogRecord for free, and the procedure computes in constant time.

The additional work done by the protocol in the procedure for updating a data item (beyond applying the update itself) takes constant time.

For the rest of this section, we assume that the number of servers is fixed and the size of data items is bounded by a constant. With these assumptions, out-of-bound copying is done in constant time (again, beyond accessing the data items themselves).

Now consider update propagation. In the SendPropagation procedure, computing tails $D_k$ is done in time linear in the number of records selected. Since only the records corresponding to updates missed by the recipient are selected, each $D_k$ is computed, at worst, in time linear to the number of data items to be sent (denoted as m). Thus, the total time to compute D is O(nm), where n is the number of servers. Under the assumption that n is fixed, the time to compute D is linear in m.

An interesting question is time to compute set S, which is the union of data items referenced by records in $D_k$, $1 \leq k \leq n$.

To compute S in O(m), we assume that every data item x has a flag IsSelected. The location of this flag is recorded in the control state associated with x. As already mentioned, whenever a log record x is added to the log, the corresponding data item is accessed. Then, the location of x's IsSelected flag can be added to the log record at the constant cost.

Then, when SendPropagation procedure adds a log record to $D_k$, the IsSelected flag of the corresponding data item x is accessed in constant time. If its value is "NO", the data item is added to S and x's IsSelected flag is flipped to "YES". The next time a record referencing x is selected (for a different tail D), it will not be added to S. Once computation of D is complete, S will contain the union of data items referenced in records from $D_k$.

Now, for every data item x in S, its IsSelected flag is flipped back to "NO". This takes time linear in the number of data items in S.

Therefore, the total time to compute SendPropagation is O(m). In addition, the message sent from the source of propagation to the recipient includes data items being propagated plus constant amount of information per data item. (This information includes the IVV of a data item and the log record of the last update to the data item on every server; recall that regular log records have constant size.)

Finally, the AcceptPropagation procedure, in the absence of out-of-bound copying, takes O(m) time to compute (in addition to accessing data items to adopt newer versions received). We conclude that in the common case, the total overhead for update propagation is O(m).

The cost of IntraNodePropagation is clearly dominated by the cost of re-applying updates accumulated by the auxiliary copy to the regular copy. This cost is linear in the number of accumulated updates and, depending on the number of such updates, may be high. However, our protocol assumes that few data items are copied out-of-bound. Then, even if overhead imposed by an out-of-bound data item is high, the total overhead is kept low. (Note that IntraNodePropagation is executed in the background and does not delay user operations or requests for update propagation or out-of-bound copying from other nodes.)

Proof of Correctness

A further definition is appropriate in regard to proving correctness as follows:

Transitive update propagation. Node i is said to perform update propagation transitively from j if it either performs update propagation from j, or it performs update propagation from k after k performed update propagation transitively from j.

Theorem 2. If update propagation is scheduled in such a way that every node eventually performs update propagation transitively from every other node, then correctness criteria as defined above are satisfied.

Alternative Embodiment

In an alternative embodiment, time stamps t are used in place of the count of updates throughout the protocol. We assume that each server timestamps its updates. A time stamp contains the local clock value or any other monotonically increasing value maintained by the server. Each server also maintains two data structures: a database version vector (DBVV) and the log of the latest updates.

In this embodiment, the DBVV Vi, in its entry corresponding to server j, or $V_{ij}$, records the timestamp of the latest update (to any data item of the database) originated at server j that is reflected on replica i.

Maintenance of DBVV involves the following:

(1) Whenever a server i performs an update, it records the timestamp of this update in the component of its DBVV that corresponds to itself, $V_{ii}$;

(2) When server i obtains a data item from another server during anti-entropy, it modifies $V_i$ to reflect the timestamps of more recent updates acquired with the data item.

In one embodiment, (2) is accomplished efficiently by taking component-wise maximum of the old $V_i$ and the DBVV received, $V_j$.

In this embodiment, a log vector has the form (x,t), where x is the name of the updated data item, and t is the timestamp assigned by j to this update.

As already described above, from all updates performed by j to a given data item that i knows about, only the record about the latest update to this data item is retained in $L_{ij}$. Hence, whenever a new record referring to a data item is added to $L_{ij}$, the existing record referring to the same data item is discarded. To do this efficiently, all records in Lij are organized in a doubly linked list. An array of pointers P(x) is associated with every data item x. Its component Pj contains the pointer to the existing record in $L_{ij}$ referring to x. When a new record (x,t) is added, the existing record is located using the pointer in $P_j(x)$, and is removed from $L_{ij}$.

As described above, when an anti-entropy protocol is run between recipient i and source j and update propagation is required, source j selects log records for transmission to recipient i. For every server k such that its corresponding DBVV component on the source is greater than on the recipient, the source browses records in the log component $L_{jk}$, starting from the tail, i.e., in decreasing order of timestamps, selecting all records until a record with the timestamp not exceeding the kth component of recipient DBVV is found. The selected records correspond to updates not seen by the recipient and, thus are sent to the recipient i, together with the copies of the data items to which these records refer. Out-of-bound copying can be handled in this alternative embodiment in a manner similar to that described above in regard to the first embodiment of the present invention and following similar principles.

Conclusion

In accordance with the present invention, we have addressed the scalability issues in epidemic replicated databases and propose a solution involving a database version vector never before described in the prior art. The epidemic approach to replica management is attractive because user operations are serviced by a single (and often a nearby) server, update propagation can be done at a convenient time (i.e., during the next dial-up session), and multiple updates can often be bundled together and propagated in a single transfer. However, existing epidemic protocols impose overhead that grows linearly with the number of data items in the database. This limits the size of the database that the system can handle without significant performance degradation. In contrast, the protocol of the present invention imposes overhead that is linear in the number of data items that actually must be copied during update propagation. Since this number is usually much lower than the total number of data items in the database, our protocol promises significant reduction of overhead. A secondary contribution is that our protocol explicitly specified correctness criteria for update propagation, separately from correctness criteria for database transactions. This allows one to reason formally about correct propagation regardless of the data consistency guarantees provided by the system to the users. Finally, we showed how some commercial replicated databases could benefit from our protocol. Our apparatus and method of maintaining consistency of database replicas should only be deemed limited by the scope of the claims which follow.

What we claim is:

1. In a computer network comprising at least one server for serving at least one client, said network being adapted for storing a plurality of database replicas, each of said database replicas comprising a plurality of data items, a method for maintaining consistency among corresponding data items in said database replicas without the need to examine content or version information for every one of said data items in any of said database replicas, comprising the steps of:

generating a database version vector for each of at least a pair of said database replicas, each of said database version vectors comprising a plurality of version vector components, said version vector components being one-to-one associated with each of said servers having one of said database replicas, each of said version vector components reflecting the number of updates previously performed on said corresponding data item at said server;

associating version information with each of said data items in each of said database replicas;

maintaining one or more logs of updates associated with each of said database replicas; each of said logs having the property that, for every data item x in a particular one of said database replicas and every server j that has one of said database replicas, said log for said particular database replica contains at least a log record $1(x,j)$ of the last update to data item x at server j that is reflected in said particular database replica's copy of data item x, said log record containing at least the name of data item x and the total update count of all updates that server j had seen at the time of the last update made from server j to said particular database replica; and determining which of said data items in each of said database replicas needs updating in order to restore complete consistency among each of said data items in a pair of said database replicas. comprising the steps, in combination of:

comparing the database version vectors of said pair of said database replicas in a component-wise fashion in order to make an initial threshold determination of whether any of said data items in any of said database replicas have been recently updated and thus require that a full comparison be made at the data item level; and determining, without the need to examine said version information of all of said data items, which individual data items in each of said database replicas needs updating with updates present in corresponding data items of another database replica, comprising the steps of:

for every server j having one of said database replicas with a version vector component in its associated database version vector that is greater than the corresponding version vector component in the database version vector of said particular database replica, determining which of said log records $1(x,j)$ on said server j have a total update count that exceeds the total number of updates obtained from said corresponding version vector component of the database version vector for said particular database; and determining therefrom that the corresponding data items in said particular database replica are older than the corresponding data items in said server j's database replica and therefore need to be updated.

2. The method as recited in claim 1 wherein said generating and comparing steps are performed by a processor of a computer of said network.

3. A method as recited in claim 2 wherein said processor of said computer is a processor of a server of said at least one server.

4. A method as recited in claim 2 wherein said processor of said computer is a processor of at least one client of said at least one server.

5. A method as recited in claim 1 wherein one of said pair of database replicas is stored in shared memory of said network.

6. A method as recited in claim 1 wherein one of said pair of database replicas is stored in memory of said at least one server.

7. A method as recited in claim 6 wherein one of said pair of database replicas is stored in memory of said at least one client.

8. The method of claim 1 further comprising the step of organizing, for a particular database replica, the log records corresponding to the last updates to every one of said data items by every one of said servers having one of said database replicas said log records being organized into a log vector having a plurality of components, each of said log vector components being one-to-one associated with one of said servers having one of said database replicas.

9. The method of claim 8 wherein each component of each of said log vectors is maintained as a doubly linked list, said doubly linked list having a head and a tail and containing log records of updates originated at said server associated with said log vector component, all of said log records in each of said log vector components being sorted in ascending order of said total update count contained in said log records, each of said log records being configured so as to point to both a predecessor and a successor one of said log records.

10. The method of claim 9 further comprising the step of associating an array of pointers with a data item.

11. The method of claim 10 wherein an element in the array of pointers points to the log record of the last update to the data item originated on the corresponding node.

12. The method of claim 9, wherein the step of determining which of said log records on said server j have a total update count that exceeds the total number of updates from the corresponding version vector component of the database version vector for said particular database replica comprises the step of selecting log records in the log vector component on said server j corresponding to said particular server, starting from said tail of said doubly linked list and proceeding to said head, until the first of said log records is encountered that has a total update count which does not exceed the number of updates in the corresponding component of said particular database replica database version vector.

13. The method of claim 12, wherein said server j sends log records selected from said log vector to the server of said particular database replica, in addition to any information sent during update propagation.

14. The method of claim 13, wherein a log vector is maintained on a server by the steps of:
  associating an array of pointers with each data item, there being an element of said array for every component in said log vector;
  storing, in the i-th element of the array of pointers associated with any data item x, a pointer to the log record of the last update to data item x which originated on server i;
  when a server j performs an update to data item x, appending the corresponding record at the end of the component of said log vector corresponding to server j;
  when a first server receives log records from a second server during update propagation, appending said received records to the corresponding components of said first server's log vector, said appending being done in an order determined by the total update counts contained in said received records; and
  when a server adds a new log record l(x,j) to its associated log vector, removing from said log vector the log record pointed to by the j-th element of the array of pointers for data item x and updating said element to point to the newly added log record.

15. The method of claim 14, wherein each of said database version vectors is maintained on a first server by the steps of:
  utilizing database version vectors as version information associated with every data item, the i-th component of the database version vector associated with any data item x on said first server recording the number of updates seen by server i and reflected in data item x on said first server;
  initially setting all version vector components of said database version vector to 0;
  incrementing the version vector component corresponding to said first server when said first server performs an update to any of said data items in the first server's database replica; and
  when any data item x on said first server is brought up-to-date with respect to a second server, for each server k such that the server k version vector component of the database version vector for data item x on said second server is greater than the server k version vector component of the database version vector for data item x on said first server, adding the difference between the two version vector components to said server k version vector component of said database version vector for data item x on said first server.

16. The method of claim 1 wherein each database version vector comprises n components where n is the number of nodes maintaining a replica of the database.

17. The method of claim 16 comprising the initial step of setting all components of each database version vector to 0.

18. The method of claim 16 further comprising the step of incrementing a component corresponding to node i of node i's database version vector, when node i updates a data item.

19. The method of claim 16 further comprising the step of recording the time stamp of the update in a record corresponding to node i of node i's database version vector, when node i does an update of a data item.

20. The method of claim 1 further comprising the step of generating an auxiliary version vector when a data item of a database replica is copied out-of-bounds.

21. The method of claim 20 further comprising the step of generating an auxiliary log record for updates to out-of-bound data items.

22. A processor for use in a computer network comprising at least one server for serving at least one client, said network being adapted for storing a plurality of databases comprising a plurality of data items, said processor for:
  (i) generating a database version vector for each one of at least a pair of database replicas of said plurality of databases, each of said database version vectors comprising a plurality of version vector components, said version vector components being one-to-one associated with each of said servers having one of said database replicas, each of said version vector components reflecting the number of updates previously performed on said corresponding data item at said server;
  (ii) maintaining one or more logs of updates associated with each of said database replicas: each of said logs having the property that, for every data item x in a particular one of said database replicas and every server i that has one of said database replicas, said log for said particular database replica contains at least a log record l(x,j) of the last update to data item x at server j that is reflected in said particular database replica's copy of data item x, said log record containing at least the name of data item x and the total update count of all updates that server j had seen at the time of the last update made from server i to said particular database replica; and
  (iii) determining which of said data items in each of said database replicas needs updating in order to restore complete consistency among each of said data items in a pair of said database replicas by:
    comparing database version vectors for a pair of database replicas in a component-wise fashion in order to make an initial threshold determination whether update propagation is required between at least said pair of database replicas; and
    determining which individual data items in each of said database replicas needs updating with updates present in corresponding data items of another database replica by, for every server j with one of said database replicas having a version vector component in its associated database version vector that is greater than the corresponding version vector component in the database version vector of said particular database replica, determining which of said log records l(x,j) on said server j have a total update count that exceeds the total number of updates from the corresponding version vector component of the database version vector for said particular database, the corresponding data items in said particular database replica therefore being older and needing to be updated; and
  said processor further having access to memory for storing said generated database version vector.

23. The processor of claim 22, wherein each log record is maintained in said memory via a log vector, each log vector having a plurality of components, each of said log vector components being one-to-one associated with one of said servers having one of said database replicas, each of said log vector components containing the log records corresponding to the last updates to every one of said data items by one of said servers having one of said database replicas.

24. The processor of claim 22 wherein said memory is associated with said computer network.

25. The processor of claim 22 wherein said memory is associated with one of said server or said client.

26. A computer network comprising at least one server for serving at least one client, said network being adapted for storing a plurality of databases comprising a plurality of data items, said computer network comprising:
   a processor for:
   (i) generating a database version vector in at least one of a pair of database replicas of said plurality of databases, each of said database version vectors comprising a plurality of version vector components, said version vector components being one-to-one associated with each of said servers having one of said database replicas, each of said version vector components reflecting the number of updates previously performed on said corresponding data item at said server;
   (ii) maintaining one or more logs of updates associated with each of said database replicas; each of said logs having the property that, for every data item x in a particular one of said database replicas and every server j that has one of said database replicas, said log for said particular database replica contains at least a log record 1(x,j) of the last update to data item x at server j that is reflected in said particular database replica's copy of data item x, said log record containing at least the name of data item x and the total update count of all updates that server j had seen at the time of the last update made from server j to said particular database replica; and
   (iii) determining which of said data items in each of said database replicas needs updating in order to restore complete consistency among each of said data items in a pair of said database replicas by:
      comparing database version vectors for said pair of database replicas in a component-wise fashion in order to make an initial threshold determination whether update propagation is required between at least said pair of database replicas; and
      determining which individual data items in each of said database replicas needs updating with updates present in corresponding data items of another database replica by, for every server j with one of said database replicas having a version vector component in its associated database version vector that is greater than the corresponding version vector component in the database version vector of said particular database replica, determining which of said log records 1(x,j) on said server j have a total update count that exceeds the total number of updates from the corresponding version vector component of the database version vector for said particular database, the corresponding data items in said particular database replica therefore being older and needing to be updated; and
   memory for storing said generated database version vectors and said log records.

27. The network of claim 26, wherein each log record is maintained in said memory via a log vector, each log vector having a plurality of components, each of said log vector components being one-to-one associated with one of said servers having one of said database replicas, each of said log vector components containing the log records corresponding to the last updates to every one of said data items by one of said servers having one of said database replicas.

28. The network of claim 26 where each database version vector comprises n components where n is the number of nodes maintaining a replica of the database.

29. The computer network of claim 26 wherein said memory is associated with said computer network.

30. The computer network of claim 26 wherein said memory is associated with said processor.

31. In a computer network comprising at least one server for serving at least one client, said network being adapted for storing a plurality of database replicas, each of said database replicas comprising a plurality of data items, a method for maintaining consistency among corresponding data items in said database replicas without the need to examine content or version information for every one of said data items in any of said database replicas, comprising the steps of:
   generating a database version vector for each of at least a pair of said database replicas, each of said database version vectors comprising a plurality of version vector components, said version vector components being one-to-one associated with each of said servers having one of said database replicas, each of said version vector components reflecting the number of updates previously performed on said corresponding data item at said server;
   associating version information with each of said data items in each of said database replicas;
   maintaining one or more logs of updates associated with each of said database replicas; each of said logs having the property that, for every data item x in a particular one of said database replicas and every server j that has one of said database replicas, said log for said particular database replica contains at least a log record 1(x,j) of the last update to data item x at server j that is reflected in said particular database replica's copy of data item x, said log record containing at least the name of data item x and a timestamp assigned to data item x reflecting the time according to the clock on said server j that said data item x was last updated by server j; and
   determining which of said data items in each of said database replicas needs updating in order to restore complete consistency among each of said data items in a pair of said database replicas, comprising the steps, in combination of:
      comparing the database version vectors of said pair of said database replicas in a component-wise fashion in order to make an initial threshold determination of whether any of said data items in any of said database replicas have been recently updated and thus require that a full comparison be made at the data item level; and
      determining, without the need to examine said version information of all of said data items, which individual data items in each of said database replicas needs updating with updates present in corresponding data items of another database replica, comprising the steps of:
         for every server j with one of said database replicas having a version vector component in its associated database version vector that is greater than the corresponding version vector component in the database version vector of said particular database replica, determining which of said log records 1(x,j) on said server j have a timestamp that is later than the timestamp in the corresponding log record on said particular database; and determining therefrom that the corresponding data items in said particular database replica are older than the corresponding data items in said server j's database replica and therefore need to be updated.

32. The method of claim 31, wherein each of said database version vectors is maintained on a first server by the steps of:

utilizing database version vectors as version information associated with every data item, the i-th component of the database version vector associated with a data item x on said first server contains the time, according to the clock on a server i, of the last update originally performed by said server i and reflected in said data item x on said first server;

initially setting all version vector components of said database version vector to 0;

storing, in the version vector component corresponding to said first server, the time when said first server performs an update to any data item in said first server's database replica; and when all data items on said first server are brought up-to-date with respect to a second server, setting each version vector component of said database version vector on said first server to the maximum of the old version vector component value and the value of the corresponding version vector component in the database version vector of said second server.

* * * * *

UNITED STATES PATENT AND TRADEMARK OFFICE
CERTIFICATE OF CORRECTION

PATENT NO. : 6,098,078
DATED : August 1, 2000
INVENTOR(S) : Narain H. Gehani, Alex Kononov and Michael Rabinovich It is certified that error appears in the above-identified patent and that said Letters Patent is hereby corrected as shown below:

<u>Title page,</u>
Item [73], after Assignee, "Lucent Technologies Inc., Murray Hill, N.J." insert second assignee -- AT&T Corp., New York, N.Y. --

Signed and Sealed this

Eighteenth Day of November, 2003

JAMES E. ROGAN
*Director of the United States Patent and Trademark Office*